United States Patent
Lin et al.

(10) Patent No.: US 11,582,286 B1
(45) Date of Patent: Feb. 14, 2023

(54) MULTIPLE APPLICATION REMOTING

(71) Applicant: Amazon Technologies, Inc., Seattle, WA (US)

(72) Inventors: Yang Lin, Seattle, WA (US); Sheshadri Supreeth Koushik, Redmond, WA (US); Deepak Suryanarayanan, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/459,279

(22) Filed: Jul. 1, 2019

Related U.S. Application Data

(63) Continuation of application No. 14/745,128, filed on Jun. 19, 2015, now Pat. No. 10,341,412.

(51) Int. Cl.
*H04L 67/025* (2022.01)
*H04L 67/1097* (2022.01)
*H04L 67/51* (2022.01)
*H04L 67/131* (2022.01)

(52) U.S. Cl.
CPC ........ *H04L 67/025* (2013.01); *H04L 67/1097* (2013.01); *H04L 67/131* (2022.05); *H04L 67/51* (2022.05)

(58) Field of Classification Search
CPC ... H04L 67/025; H04L 67/1097; H04L 67/16; H04L 67/38
See application file for complete search history.

(56) References Cited

U.S. PATENT DOCUMENTS

| | | | |
|---|---|---|---|
| 9,245,095 B2 | 1/2016 | Sarma et al. | |
| 9,652,273 B2 | 5/2017 | Davis et al. | |
| 2007/0028238 A1 | 2/2007 | Bennett et al. | |
| 2010/0318630 A1 | 12/2010 | Howell et al. | |
| 2011/0029672 A1 | 2/2011 | Agneeswaran | |
| 2011/0295999 A1 | 12/2011 | Ferris et al. | |
| 2012/0311564 A1 | 12/2012 | Khalid | |
| 2013/0060919 A1* | 3/2013 | Khandekar | G06F 9/45558 709/220 |
| 2014/0013153 A1 | 1/2014 | Chittigala et al. | |
| 2014/0040878 A1* | 2/2014 | Mann | G06F 8/61 717/174 |
| 2015/0309828 A1 | 10/2015 | Shaik et al. | |

OTHER PUBLICATIONS

Overview of Remote App; https://technet.microsoft.com/en-us/library/cc755055.aspx; Microsoft; .COPYRGT. 2015; accessed Jun. 15, 2015; 1 page.

* cited by examiner

*Primary Examiner* — Thomas J Dailey
(74) *Attorney, Agent, or Firm* — BakerHostetler

(57) ABSTRACT

Techniques for providing remote access to application content are described herein. A virtual computing node may be leased to a first user requesting access to an application. On the virtual computing node, a virtualization process may spawn the application as a child process. In response to a second request, by the same user, to access an additional application, the virtual computing node may be identified. The virtualization process may spawn the second application as a child process in the process space of the first application. Data may be exchanged between the applications within the process space.

20 Claims, 8 Drawing Sheets

MULTIPLE APPLICATION REMOTING

CROSS-REFERENCE

The present application is a continuation of U.S. patent application Ser. No. 14/745,128, entitled "MULTIPLE APPLICATION REMOTING", filed Jun. 19, 2015, the contents of which are incorporated herein by reference in its entirety.

BACKGROUND

Recently, the use of virtualization technologies to provide remotely generated application content to users has become increasingly widespread. Typically, technological concepts such as streaming are employed to execute applications at a data center and transmit content generated by the application over a network to a device possessed by an end user. This approach to providing application content allows for a number of advantages, such as enabling data to be stored at a central location and minimizing the hardware capabilities required of the end user's device. However, the provision of application content to an end user presents a variety of challenges to the content provider. Among these are the need to efficiently utilize the resources of the data center while also providing convenient means for interacting with and accessing application content.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
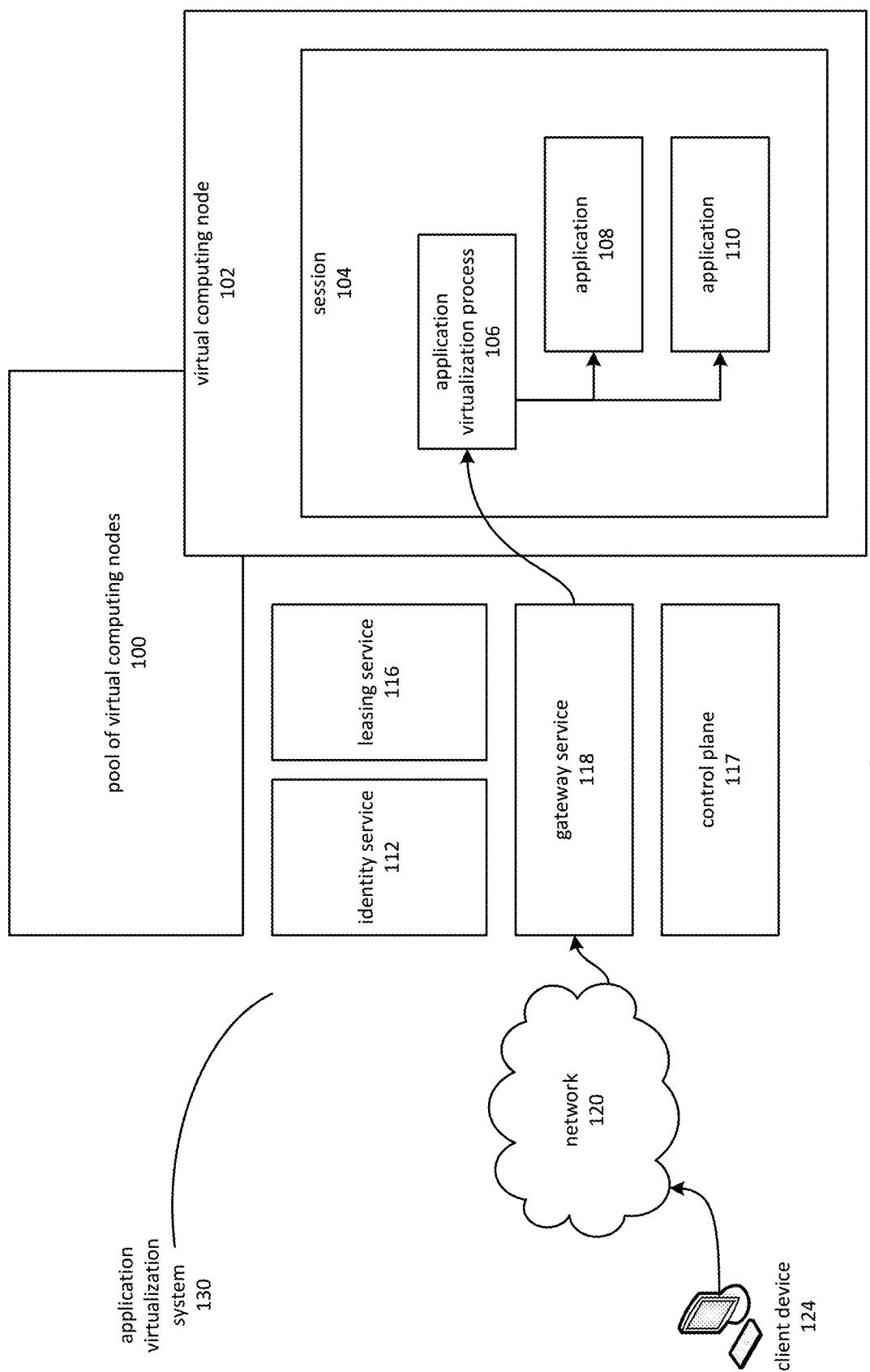
FIG. 1 is diagram illustrating an example application virtualization system.

Techniques for remote delivery of application content are described herein. In an example, a user requests access to an application that will execute on a remote virtual computing node. The application is executed on the computing node and the content it generates is streamed to the user's client device, rather than executing the application directly on the client device. The application executes as a child process of another process that may be referred to as an application virtualization process. When the user requests access to a second application, the application virtualization process also executes the second application as a child process. Data may be shared between the two applications, in part because the first and second applications are both children of the application virtualization process.

Streaming an application may involve transmitting graphical, audio, or other output from an application that is being executed on a virtual computing node in a data center to a client device. The application may also receive input of various forms from the client device. The application may then process the input, and in so doing produce various forms of output, some or all of which may be transmitted to the client device where the user may view and interact with the application's output. This approach may be used to simulate the effect of executing the application on the client device.

Some approaches to providing remote access to an application may involve providing a user with remote access to a complete desktop session that is executing on a virtual computing node. For example, the user might be provided access to the virtual computing node's file system, system menus, and so forth, and might be able to choose which applications to run from any number of applications that have been installed on that instance of the virtual computing node. In other words, the user is provided with an experience that is not unlike the experience of interacting with the operating system of a locally located personal computer.

In other cases the user is not granted access to a complete desktop session on the virtual computing node. Instead, the user might be provided with access to a specific application that is executing within a dedicated session of the virtual computing node. This approach may have various benefits over providing remote access to a complete desktop, such as simplicity for users who are only interested in accessing one or two particular applications. The approach may also reduce the consumption of the computing resources that might be needed to provide access to a complete desktop. However, the approach also limits the ability of the user to share data between applications that are being executed remotely.

Data sharing may be facilitated by executing applications as child processes of an application virtualization process. When a user requests access to a first application, a virtual computing node may be withdrawn from a pool of such nodes and leased to the user for a period of time. An application virtualization process is executed on the leased virtual computing node, and it then launches the first application as a child process. When the same user requests access to a second application, the leased virtual computing node is identified and used to execute the second application in addition to the first. The second application is also launched as a child process of the application virtualization process. Data sharing between the two applications is facilitated due to both the first and second applications being child processes of the application virtualization process. Various additional features and aspects of this technique are described herein.

FIG. 1 is diagram illustrating an example application virtualization system 130. A client device 124 may use the application virtualization system 130 to obtain access and, in some cases, to interact with content produced by a plurality of applications that execute in a virtualized computing environment that is provided by the application virtualization system 130. In contrast to a typical desktop-oriented virtualized computing environment, the application virtualization system 130 is oriented to providing remote access to application content, rather than providing remote access to complete desktops. This may provide various benefits, such as simplifying the user experience and allowing integration with the native desktop environment of client device 124. The application virtualization system 130 maintains a pool of virtual computing nodes 100 that may be withdrawn from the pool to provide a user of client device 124 with access to a requested application. One possible approach would be to associate applications with virtual computing nodes on a one-to-one basis, which is to say that a single instance of a requested application would, following this approach, execute on a single virtual computing node. However, in order to facilitate data sharing, the application virtualization system 130 may execute more than one application, or more than one instance of an application, on a single virtual computing node, without providing remote access to a complete desktop.

The client device 124 may be any of various types of computing devices, such as a personal computer, smartphone, tablet, and so on. The client device 124 may, in some instances, be provided with instructions for displaying a remote application dashboard that may be used to indicate that the user of the client device 124 wishes to obtain access to the content of a remotely executed application. An application icon linking to the remote application might also be provided, and could be clicked on by the user as a means of indicating that the user wishes to access the remote application. When the user interacts with the dashboard or icon to indicate that he or she wishes to access the remote application, the client device 124 may transmit a request, via network 120, to the application virtualization system 130. The network 120 may be any of various types or combination thereof, such as Internet-Protocol ("IP") based intranets and the Internet. The application virtualization system 130 may in some cases be hosted off-premises, possibly by a third-party provider of computing services.

A control plane 117 may receive the request for access to the remote application. The control plane 117 may, in response to receiving the request, cause an identity service 112 to verify the identity of the user of the client device 124. Note that a user may, in some cases, refer to an account or set of credentials that is used as a basis for authorizing access to a computing system. In other cases, a user may also refer to a person or other entity that makes use of a computing system. The identity service 112 may provide a token or other identifier that can be used to uniquely identify the user that is associated with the request for access to the application. The identity service 112 may include federated identity features that can provide an identifier of the user that is constant over a plurality of systems and networks. The use of a federated identity may enable the leasing service 116 to associate a user with a virtual computing node, such as the depicted virtual computing node 102, over multiple requests to access an application.

The leasing service 116 may be notified that a user is requesting access to a first application 108. In response, the leasing service 116 may use the user identifier from the identity service 112 to determine if the user has already been assigned a virtual computing node. If not, the leasing service 116 may obtain a virtual computing node from the pool of virtual computing nodes 100. With respect to FIG. 1, the leasing service 116 may have identified the depicted virtual computing node 102 as not currently being assigned, or leased, to any other user, and in response formed an association between the user the of computing device 124 and the virtual computing node 102. The association may be described as a lease. The leasing service 116 may assign a period of time during which the lease, held by the user of the computing device 124, is considered valid. The leasing service 116 may, for example, maintain the validity of the lease while at least one application is running on behalf of the user, but cause the lease to expire after a period of inactivity or for a period of time when no applications are running on the instance.

After the virtual computing node 102 has been selected by the leasing service 116, the control plane 117 may enable communication between the client device 124 and the virtual computing node 102. Communication may be enabled through a gateway service 118. On the virtual computing node 102, within a session 104 of the operating system that is operable on the virtual computing node 102, an application virtualization process 106 may be started by the control plane 117. The application virtualization process 106 may then be instructed, typically by the control plane 117, to instantiate an instance of the first application 108. The application virtualization process 106 may then instantiate the first application 108 as a child process.

The leasing service 116 may also respond to a request by the user of the computing device 124 to access a second application 110. The leasing service 116 may determine that the virtual computing node 102 has been previously leased to the user of the computing device 124, and that the lease is still active. The leasing service 116 may determine that, because the identity of the user requesting access to the second application is the same identity as the user who requested access to the first application and was leased the virtual computing node 102, the same virtual computing node 102 may be used to execute the second application 110. The control plane 117 may then instruct the application virtualization process 106 to start the second application 110.

There may be various cases where the user of the computing device 124 wishes to share data between the two applications. For example, the user might want to perform cut-and-paste operations between the two applications. The application virtualization process 106 may start the second application 110 as a child process, as it did with the first application 108. Accordingly, both the first application 108 and the second application 110 may operate as child processes of the application virtualization process 106. As a result, the two applications 108 and 110 may share a process space—that of their parent process, the application virtualization process 106—and may be able to share data more easily than would be the case if they were not child processes of the same parent.

Figure 2:
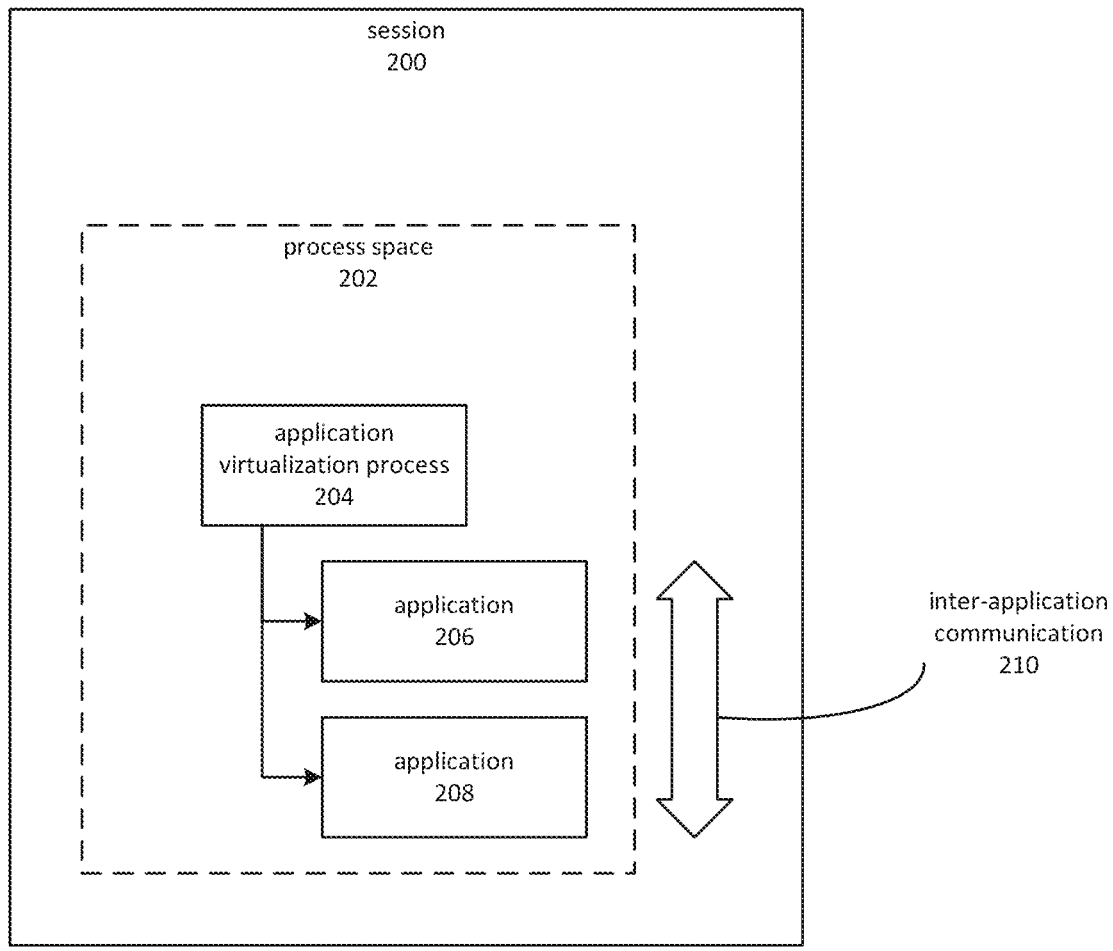
FIG. 2 is a diagram illustrating communication between remoted applications in a common process space.

FIG. 2 is a block diagram illustrating communication between remoted applications in a common process space. A session 200 may be a login session of an operating system. In general terms, the session 200 is associated with some set of credentials being validated and the associated account being granted access to various resources of the operating system, such as files, kernel services, and so forth.

An application virtualization process 204 may be started and may execute within the session 200. The application virtualization process 204 may provide various functions related to providing access to the virtualized applications, such as capturing the graphical output of the applications. In addition, the application virtualization process 204 may receive and process requests to start applications that are to be remoted. For example, the application virtualization process 204 may have received and processed requests to start a first application 206 and a second application 208. As noted, the application virtualization process may start the applications 206 and 208 as child processes. A child process is an executing computer process that may be spawned or created by another process, which may be referred to as the parent process. A child process may inherit various properties and access rights from its parent. These properties and access rights can include file descriptors, memory address spaces, and various authorizations. Together, these may be referred to as a process space 202. Accordingly, as depicted in FIG. 2, the first application 206 and the second application 208 share a process space 202 with each other and with the application virtualization process 204.

By sharing process space 202, inter-application communication 210 is facilitated. The application virtualization process 204 may provide various mechanisms for further facilitating inter-application communication, such as enabling cut-and-paste operations. Typically, this may be done in conjunction with the features of the operating system on which the session 200 is operating. In addition to facilitating inter-application communication 210, the process space 202 can comprise a "sandbox" that contributes to isolation and security of the data contained in and shared by the applications 206 and 208.

Figure 3:
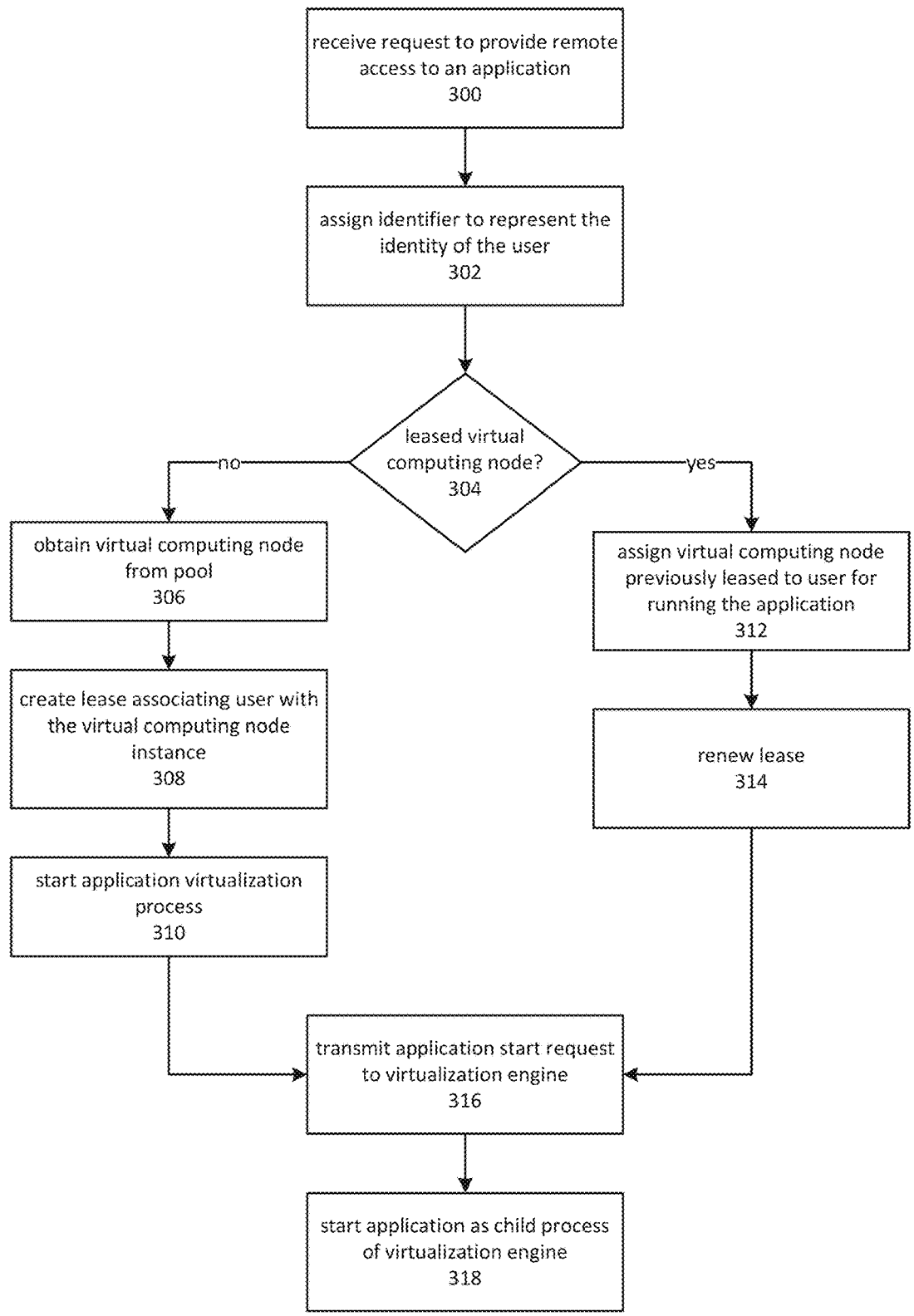
FIG. 3 is a diagram illustrating an example multiple application remoting procedure that may be used in accordance with the present disclosure.

FIG. 3 is a diagram illustrating an example multiple application remoting process that may be used in accordance with the present disclosure. At operation 300, a control plane, such as the control plane 117 depicted in FIG. 1, may receive a request to provide remote access to an application. The request may comprise a data packet received over the network 120 from the client device 124. The data packet may include information that specifies which application is to be started, parameters that might be supplied to the application, and user credentials or other information that may be used by the identity service 112 for verifying the identity of the user and for assigning an identifier to represent the identity of the user.

Operation 302 depicts the identity service 112 assigning an identifier that may be used to represent the user's identity. The identity service 112 may work with (or as) a federated identity service so that the identifier for a particular user remains constant over an acceptable period of time, and across multiple devices and networks. For example, the identity service 112 may ensure that the same identifier is used when a user accesses the application virtualization system 130 from a personal computer and then from a smartphone. As a result of this approach, the user may be able to share data between the user's remoted applications even though the devices from which the applications are being accessed are different. The user of a constant identifier allows a proper association to be made to a virtual computing node instance already leased by the user, even when the platform from which the user is accessing the application virtualization system 130 has changed.

Using the identifier, the control plane 117 may determine whether or not the user is currently associated with a lease of a virtual computing node instance. This is depicted by operation 304. If the user is associated with an active lease, the leased virtual computing node may be assigned the user for running the new application, and the lease may be renewed. These steps are depicted by operations 312 and 314.

If there is no instance of a virtual computing node that is leased to the user, a virtual computing node may be assigned to the user and leased. For example, if the user is not associated with a lease of a virtual computing node, a virtual computing node may be obtained from the pool of virtual computing nodes 100, as depicted by operation 306. In this example scenario, the selected virtual computing node might be the virtual computing node 102 that is depicted in FIG. 1. The leasing service 116 may search the pool of virtual computing nodes 100 to identify the virtual computing node 102 that is not leased by any user, or that is leased by a user but the lease has expired and therefore might be able to be reclaimed. Other factors might also influence the selection of a virtual computing node, such as whether the application is graphics-intensive and requires a virtual computing node with access to graphics rendering hardware, whether the virtual computing node has sufficient resources for the application, and so forth.

The pool of virtual computing nodes 100 may be maintained by a fleet management service (not shown). The fleet management service may prepare computing nodes and place them in the pool of virtual computing nodes 100. For example, the fleet management service might monitor the number of available virtual computing nodes in the pool of virtual computing nodes 100 and, when the number falls below a threshold level, prepare additional virtual computing nodes and add them to the pool of virtual computing nodes 100.

At operation 308, the leasing service 116 creates a lease to mark the association between the user and the virtual computing node instance. A lease may refer to a record of data, stored within the application virtualization system 130, which indicates that a user is associated with a particular virtual computing node instance. The record may, for example, comprise the identifier assigned by the identity service 112, a reference to the virtual computing node instance 102, and an indication of how long the lease should remain valid in the event that no application is running on it or that there is a period of inactivity. The record may, in some instances, be maintained in the pool of virtual computing nodes 100. The leasing service 116 may, in some instances, maintain the record and delete it after the lease has expired.

The leasing service 116 may, at operation 308, set a period of expiration for the lease. The expiration period may be relative to various conditions or events. For example, some period of time in which no input is provided by the user might elapse, or some amount of time in which no application is running on the virtual computing node. In various instances, the amount of time remaining on a lease might be reset periodically, such as each time user input directed at the application is received. The lease might also be renewed based on activity occurring on a dashboard program running on the client device 124, even if no application is currently running on the virtual computing node 102 or no input is being provided to an application running on the virtual computing node 102.

Operation 310 illustrates starting an application virtualization process 106 on the virtual computing node 102. The application virtualization process 106 might be started each time the session 104 is started. Alternatively, the application virtualization process 106 may be left running on the virtual computing node 102 so that it is running and accessible when the virtual computing node 102 is withdrawn from the pool of virtual computing node instances 100.

The application virtualization process 106 may communicate with other elements of the application virtualization system 130, such as with the control plane 117 and the client device 124. Communication with the client device 124 may be via the network 120 and the gateway service 118. The application virtualization process 106 may receive requests to launch applications, to which it may respond by launching the applications as child processes.

Operations 312 and 314 may be performed if there had already been an instance of a virtual computing node with a lease held by the user. At operation 312, the leasing service 116 may assign the virtual computing node 102 to the user based on the virtual computing node 102 having been previously leased to the user. The prior lease may have been based on the user's request to access another application, or another instance of the same application. The selection may be based on correspondence between a user identifier stored with a record representing the lease and the identifier of the user who requested access to the application at operation 300. At operation 314, the lease may be renewed based on the user requesting access to the new application 110.

At operation 316, the control plane 117 may transmit a request to the application virtualization process 106 to start the application for which remote access was requested at operation 300. Alternatively, the request may be transmitted from the client device 124, over the network 120, and through the gateway service 118 to the application virtualization process 106.

If the application virtualization process 106 had previously started another application, it may have been started as a child process of the application virtualization process 106. The new application 110, to which access was requested at operation 300, may also be started by the application virtualization process 106 as a child of the application virtualization process 106. Operation 318 depicts starting the application as a child process of the virtualization process. Any prior applications that are still running, as well as the application just started, may share data due at least in part to being children of a common parent process.

Figure 4:
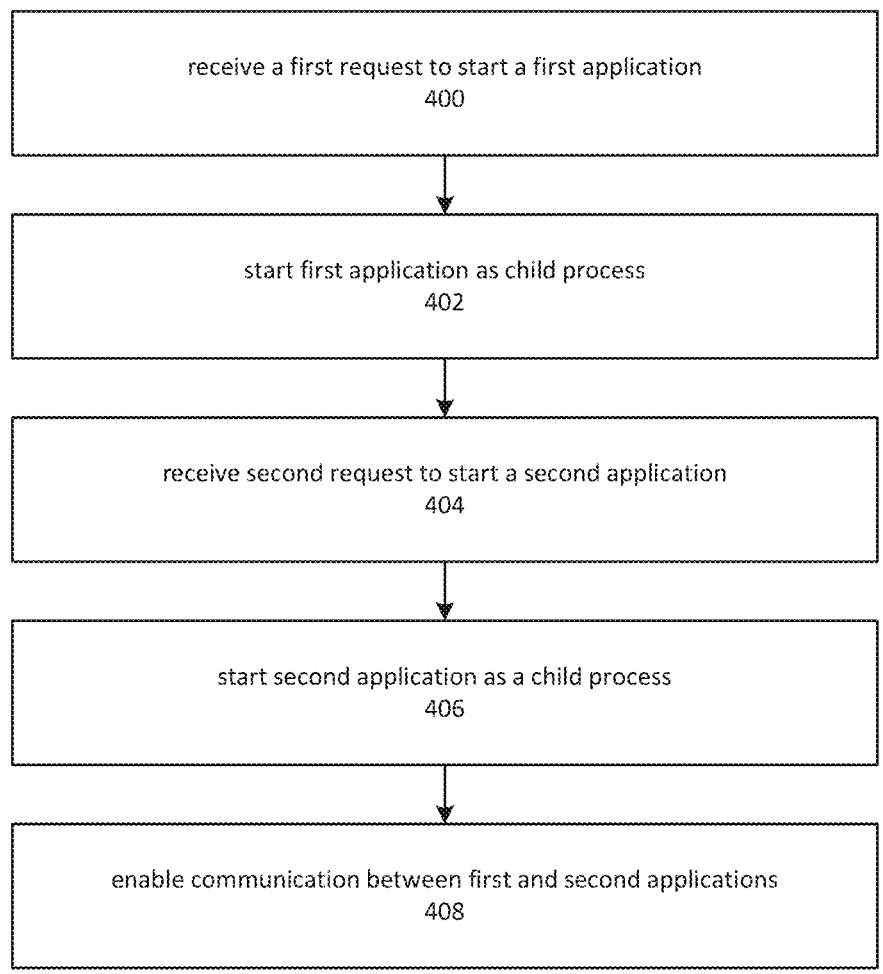
FIG. 4 is a diagram depicting an example procedure for virtualizing applications that may be used in accordance with the present disclosure.

The application virtualization process 106 may be better understood in view of FIG. 4, which is a diagram depicting an example procedure for virtualizing applications that may be used in accordance with the present disclosure. An application virtualization process, such as the application virtualization process 106 that is depicted in FIG. 1, may execute within a session 104 of the operating system of the virtual computing node 102.

Operation 400 depicts the application virtualization process 106 receiving a first request to start a first application. For example, the client device 124 may send a message over the network 120, and routed to the application virtualization process 106 by the gateway service 118. The message may include information that indicates which application is to be started. The application virtualization process 106 may receive the message and proceed to start the application.

Operation 402 depicts the application virtualization process 106 starting the first application as a child process. Starting the application may involve performing a process-spawning operation in which the instance of the first application is created to be a child process of the virtualization process 106. In some instances, various actions may be performed prior to or in conjunction with the spawning operation to enable the selected application to execute on the virtual computing node 102. These actions can include identifying and loading resources that the application requires in order to execute.

Operation 404 depicts the application virtualization process 106 receiving a second request to start a second application, and operation 406 depicts the application virtualization process 106 starting the second application. These operations may be performed in a manner similar to operations 400 and 402. The second application may be spawned as a child process of itself and as a sibling of the first application, so that each of these processes may share a process space.

Operation 408 depicts enabling communication between the first application and the second application. This may involve interaction between the application virtualization process 106 and the session 104, and possibly other aspects of the operating system, in order to enable sharing data through various mechanisms such as cut-and-paste, shared memory, and so on. In some instances, the enabling of data sharing between the applications may be a side effect of being child processes of the same parent. Data transfer from the first application to the second application may, in some cases, be permitted by the security controls of the operating system based on the first and second applications being child processes of the virtualization process. In a typical operating system, processes may be granted a set of access rights, permissions, and other attributes that indicate whether or not the process is able to obtain access to various resources on the system, such as files, handles, and memory. When a process spawns a child process, it may indicate whether or not the child process should inherit some or all of the access rights, permissions, and other attributes. In addition, the child process may share and be granted access to the parent's address space. This may facilitate data sharing by, for example, allowing data to be exchanged between child processes via the parent process. The parent process and the child process may also have an address space layout that is similar to or identical to the parent, and may also be able to access common blocks of physical memory. These features may also facilitate data sharing between the child processes.

Figure 5:
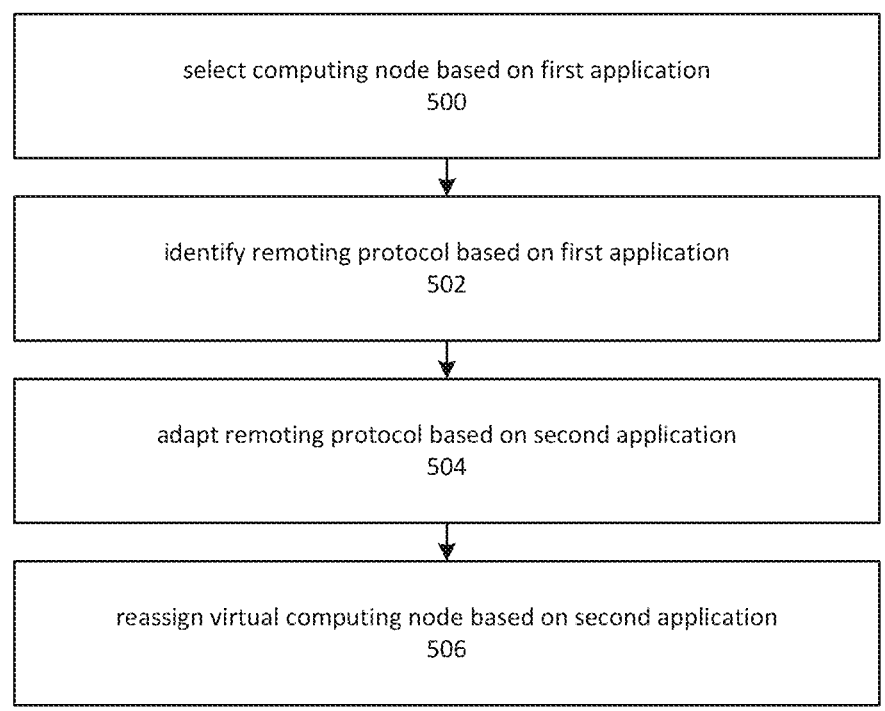
FIG. 5 is a diagram depicting an example procedure for adapting application virtualization to a combination of applications.

FIG. 5 is a diagram depicting an example procedure for adapting application virtualization to a combination of applications. The procedure depicted by FIG. 5 might be employed, for example, to adapt application virtualization to a succession of applications to which a user requests access.

At operation 500, a component of the application virtualization system 130, such as the control plane 117, may cause the computing node instance to select a virtual computing node based on the first application. For example, a component of the application virtualization system 130 depicted in FIG. 1 might analyze the computing capacity needed by a first application and select a virtual computing node suitable to that capacity. For example, a user might log on to the application virtualization system 130 and request access to a word-processing program. If the word-processing program has a relatively low need for computing power, a relatively low-powered virtual computing node might be assigned to it.

At operation 502, a remoting protocol may be identified based on the first application. This could, for example, comprise selecting a general-purpose remoting protocol if the first application is a productivity application, or a graphics-specialized remoting protocol if the first application is a graphics-intensive videogame. A remoting protocol may include rules or guidelines for interaction between a client device and a remotely executing application. The remoting protocol may, for example, define messages that may be exchanged between the client device and the remotely executing application, where the messages enable the client device to interact with the remotely executing application and to display the application content. In some instances, the application virtualization process 106 may be identified as the remoted application to the client device for the purposes of conforming to the remoting protocol. The client device may interact with the application virtualization process 106 as if it were the remoted application, and the application virtualization process 106 may forward messages to and from the applications 108 and 110.

In some cases, the addition of a second application to the virtual computing node may cause the initial selections to become less effective than they were originally. Operation 504 depicts that the remoting protocol may be adapted based on the second application. For example, if the first application was a word-processing program but the second application was a computer-aided design program, the protocol might be switched to a graphics-specialized protocol. This might involve the application virtualization process 106 and gateway service 118 being notified of the change and reestablishing communication using the new protocol.

In some instances, a user may hold multiple leases on a plurality of computing nodes. When the user requests access to an additional application, the application virtualization process 106 may determine which virtual computing node should be used to host the additional application based on the nature of the additional application and the types of applications executing on the computing nodes for which the user holds a lease. In some instances, the application virtualization process 106 may select a remoting protocol suitable for the application and then, based on the remoting protocol, select the computing node for executing an application. For example, a user might be granted two leases. The first lease might be for a first virtual computing node that may host productivity applications, and the second lease might be for a second virtual computing node that may host graphics-oriented applications. The application virtualization process running on the first virtual computing node might utilize a general-purpose remoting protocol, while the second virtual computing node might utilize a remoting protocol that is optimized for graphics transmission. When the user requests access to an additional application, it might be executed on the first computing node if it is not a graphics-intensive application, or it might be executed on the second computing node if it is graphics-intensive.

Operation 506 depicts a reassigning the virtual computing node based on the second application. Continuing the previous example scenario, the first program may have been a word-processing program and the second program may have been a computer-aided design program. Due to the graphics-intensive nature of computer-aided design programs, access to specialized graphics hardware may be desired for optimal performance of the program. In response to this condition, the leasing service 116 might be instructed to locate a virtual computing node from the pool of virtual computing nodes 100 that has access to graphics rendering hardware. The leasing service 116 might then transfer the user's lease from the original virtual computing node, which lacked access to graphics rendering hardware, to the new virtual computing node, which has access to graphics rendering hardware.

Figure 6:
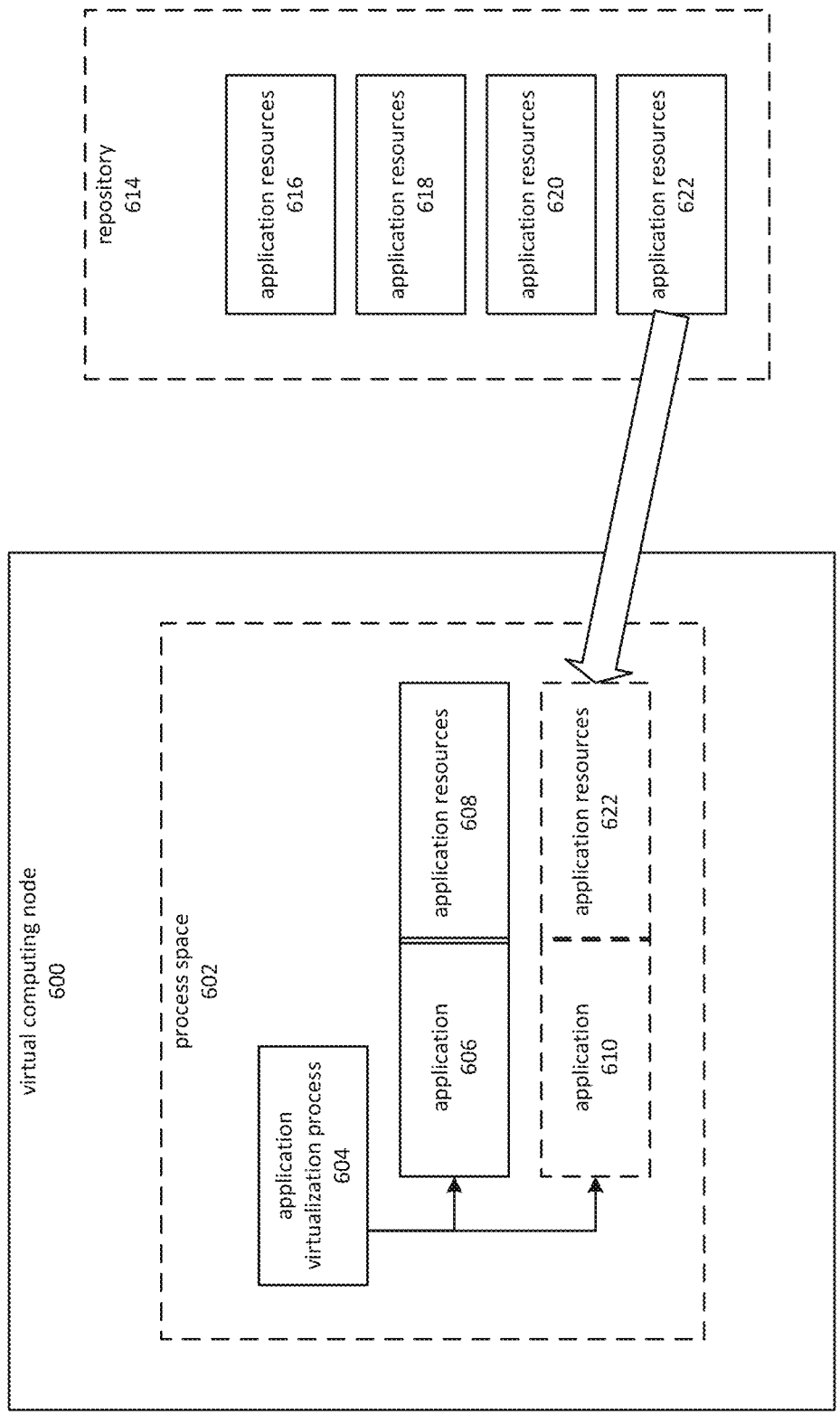
FIG. 6 is a diagram illustrating adaptation of a virtual computing node to a combination of applications.

In some instances, the resources available to a virtual computing node may be adapted as the virtual computing node is utilized to execute an additional application. FIG. 6 is a diagram illustrating adaptation of a virtual computing node to a combination of applications. In an example scenario, the virtual computing node 600 may have been leased to a user who had requested access to a first application 606. In order to execute the application, various application resources 608 may have been installed, copied, or otherwise made available to the virtual computing node 600, and/or to the process space 602 in which the application virtualization process 604 and the first application 606 operate.

Resources needed to run certain applications may be maintained in a repository 614, from which they may be loaded on-demand into an instance of a virtual machine. The repository 614 might be a separate file system, a database, or some other storage mechanism. The repository 614 might contain various application resources 616-622. The application resources 616-622 can comprise application files, virtual computing node image deltas, and so forth. A virtual machine image delta, for example, might be applied to modify an existing virtual computing node image file to contain the executable files or other data needed to execute an application.

In an example scenario, a user might request remote access to a second application 610. In response to the request, an application virtualization process 604 might be notified that the second application 610 is to be launched. The application resources 622 needed to execute application 610 may be loaded onto the virtual computing node 600. This may involve loading the resources of the second application and mapping them into the address space on the virtual computing node that is associated with the application virtualization process. Once the resources are loaded, the application virtualization process 604 can launch the application 610 as a child process, so that it shares a process space 602 with the other application 606, and with the application virtualization process 604.

In some instances, when a user is associated with a virtual computing node instance—for example by being issued a lease—application resources for other applications commonly used by the same user may be loaded onto the virtual computing node 600 in anticipation of the user requesting remote access to the application. The application resources 622 used by the second application 610 might, for example, be loaded into the memory of the virtual computing node 600 based on a frequency with which the second application is executed, either by itself or in combination with the first application 606.

Figure 7:
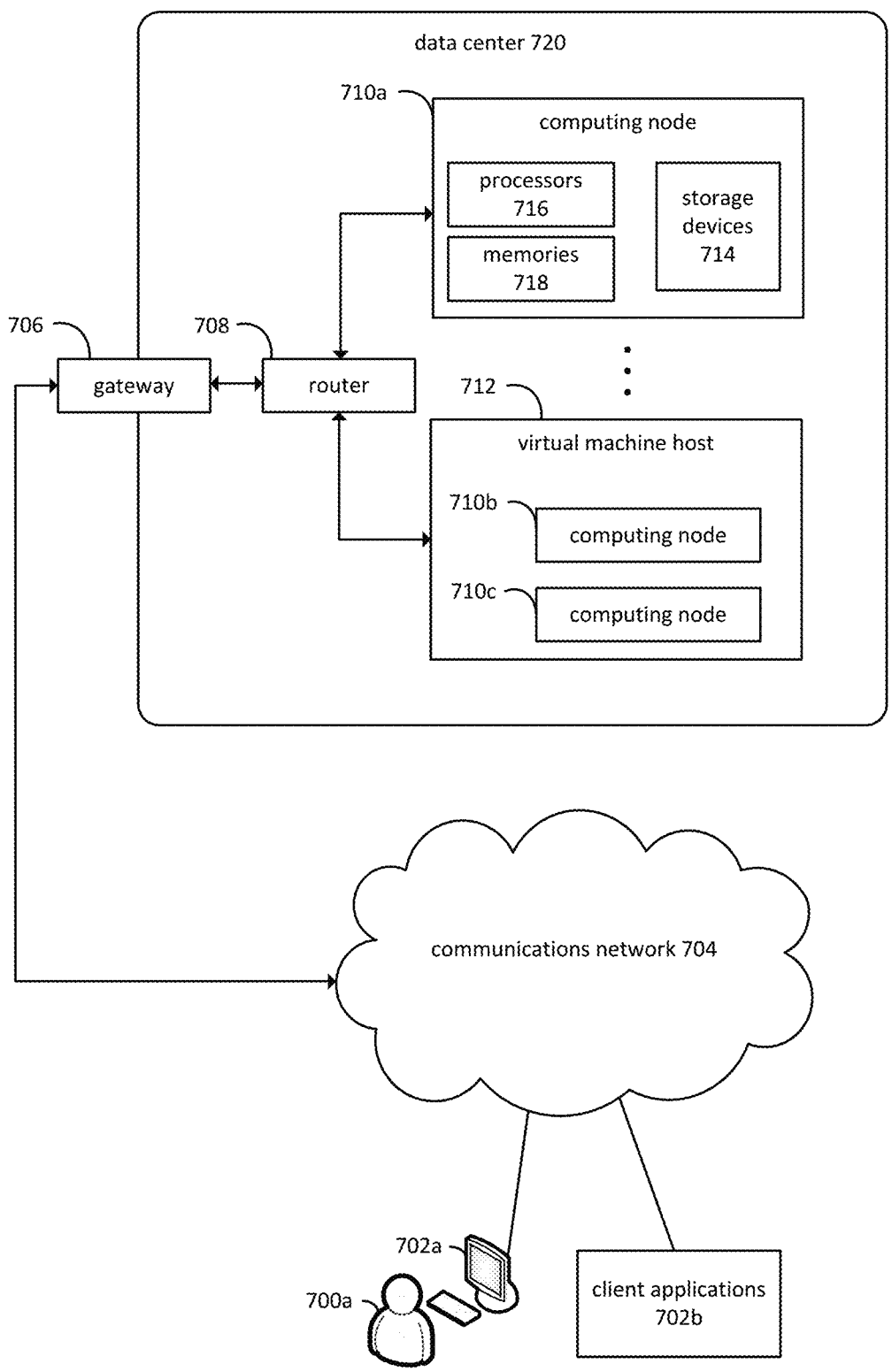
FIG. 7 is a diagram illustrating an example computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710*a* is depicted as residing on physical hardware comprising one or more processors 716, one or more memories 718, and one or more storage devices 714. Processes on computing node 710*a* may execute in conjunction with an operating system or alternatively may execute as a bare-metal process that directly interacts with physical resources, such as processors 716, memories 718, or storage devices 714.

Computing nodes 710*b* and 710*c* are depicted as operating on virtual machine host 712, which may provide shared access to various physical resources, such as physical processors, memory, and storage devices. Any number of virtualization mechanisms might be employed to host the computing nodes. A computing node operating as a virtual machine, such as the computing nodes 710*b* and 710*c* which operate on virtual machine host 712, may be described as a virtual computing node.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
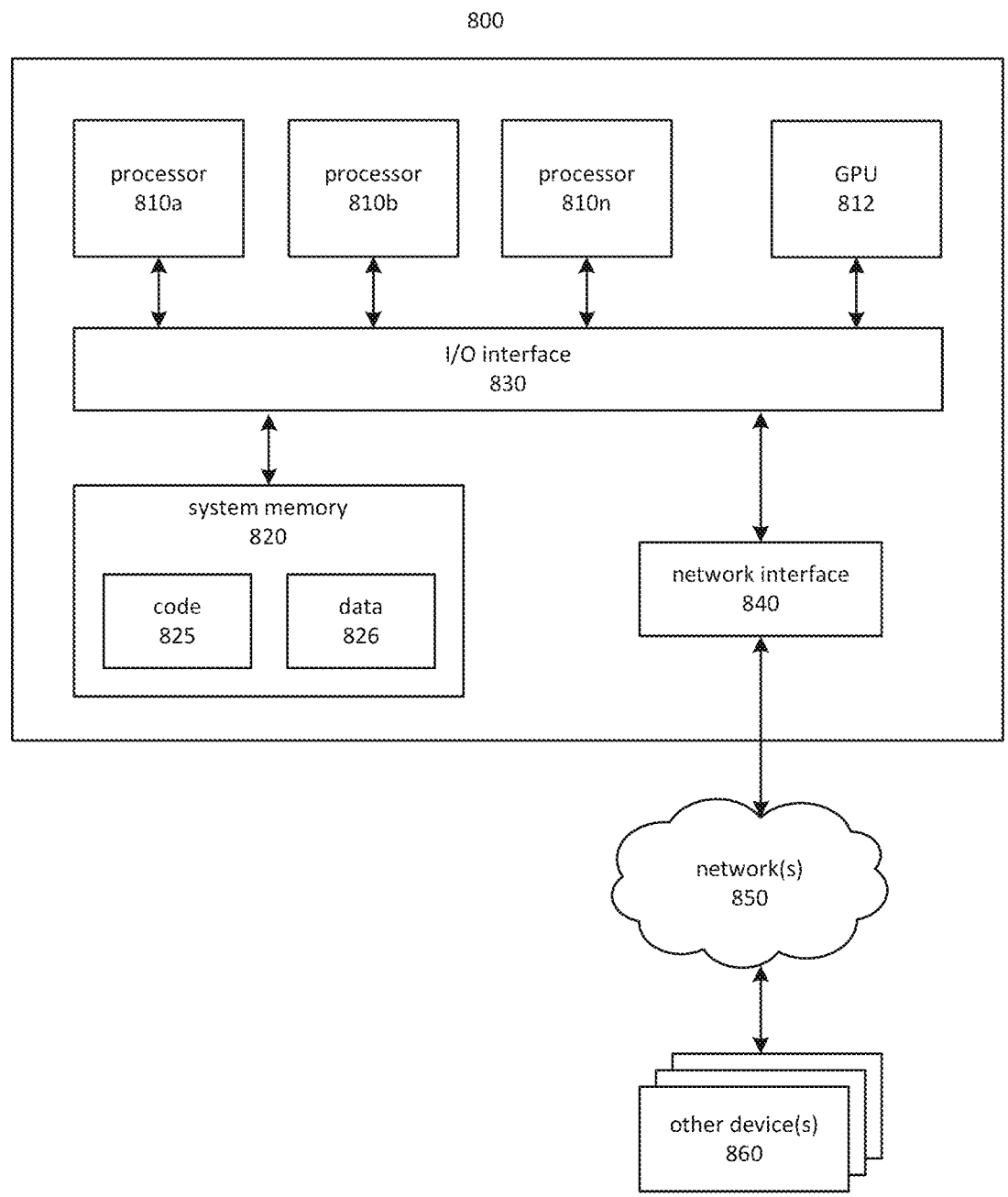
FIG. 8 is a diagram illustrating an example computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer- accessible media. In the illustrated embodiment, computing device 800 includes one or more processors 810*a*, 810*b*, and/or 810*n* (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
    receiving over a network from a remote computing device a first request indicative of a selection by a user of a first application on the remote computing device, the first application selected from among a plurality of applications;
    starting the first application as a first child process of an application virtualization process, the application virtualization process being executed on an operating system operating on a first virtual machine of a computing node separate from the remote computing device;
    receiving over a network from the remote computing device a second request indicative of another selection by the user of a second application on the remote computing device, the second application selected from among the plurality of applications;
    starting the second application as a second child process of the application virtualization process; and
    enabling communication between the first and second application after starting on the application virtualization process.

2. The method as recited in claim 1, wherein enabling communication between the first and second application after starting on the application virtualization process comprises using a shared memory.

3. The method as recited in claim 1, wherein the first virtual machine is selected for operation of the application virtualization process based on at least one of the first or second application.

4. The method as recited in claim 1, wherein the first and second applications are started in the same dedicated session that is limited to the application virtualization process and child processes of the application virtualization process.

5. The method as recited in claim 1, wherein the application virtualization process isolates the user to access the resources on the first virtual machine only by way of the first and second applications.

6. The method as recited in claim 1, wherein the enabling communication between the first and second application comprises enabling cut-and-paste operations.

7. The method as recited in claim 1, wherein the application virtualization process forwards messages to and from the applications and the remote computing device.

8. A system comprising at least one computer processor configured to allow the system to perform the operations comprising:
  process a first request indicative of a selection by a user of a first application, the first request received over a network from a remote computing device, the first application selected from among a plurality of applications;
  launch the first application as a first child process of an application virtualization process, the application virtualization process being executed on an operating system operating on a first virtual machine of a computing node separate from the remote computing device;
  process a second request indicative of a selection by a user of a second application, the second request received over the network from the remote computing device, the second application selected from among the plurality of applications;
  launching the second application as a second child process of the application virtualization process; and
  enabling communication between the first and second application after launching as child processes of the application virtualization process.

9. The system as recited in claim 8, wherein enabling communication between the first and second application after starting on the application virtualization process comprises configuring first and second application to use a shared memory.

10. The system as recited in claim 8, further configured to allow the system to perform the operations comprising selecting the first virtual machine for the operation of the application virtualization process based on computing requirements of at least one of the first or second application.

11. The system as recited in claim 8, further configured to allow the system to perform the operations comprising launching the first and second applications in a same dedicated session that is limited to the application virtualization process and child processes of the application virtualization process.

12. The system as recited in claim 8, wherein the application virtualization process is configured to isolate the user to access the resources on the virtual machine only by way of the first and second applications.

13. The system as recited in claim 8, wherein the enabling communication between the first and second application comprises enabling cut-and-paste operations.

14. The system as recited in claim 8, wherein the application virtualization process forwards messages to and from the applications and the remote computing device.

15. A non-transitory computer-readable storage medium having stored thereon computer readable-instructions that upon execution cause a system at least to:
  determine from a first request that a user of a remote computing device selected for execution a first application from among a plurality of applications;
  execute the first application as a first child process of an application virtualization process, the application virtualization process being executed on an operating system operating on a first virtual machine of a computing node separate from the remote computing device;
  determine from a second request that the user of the remote computing device selected for execution a second application from among the plurality of applications;
  execute the second application as a second child process of the application virtualization process; and
  enable the first and second application to communicate with each other on the first virtual machine.

16. The non-transitory computer-readable storage medium as recited in claim 15, wherein the first and second application are configured to communicate by way of a shared memory.

17. The non-transitory computer-readable storage medium as recited in claim 15, wherein the computer readable-instructions that upon execution further cause the system at least to select the first virtual machine for the operation of the application virtualization process based on computing requirements of at least one of the first or second application.

18. The non-transitory computer-readable storage medium as recited in claim 15, wherein the computer readable-instructions that upon execution further cause the system at least to execute the first and second applications in a single dedicated session that is limited to the application virtualization process and child processes of the application virtualization process.

19. The non-transitory computer-readable storage medium as recited in claim 15, wherein the application virtualization process is configured to isolate the user to access the resources on the first virtual machine only by way of the first and second applications.

20. The non-transitory computer-readable storage medium as recited in claim 15, wherein the computer readable-instructions that upon execution further cause the system at least to load resources for at least one of the first or second application in a repository.

* * * * *